June 5, 1928.

M. W. CARROLL

PUMP PLUNGER

Filed March 7, 1925

WITNESS:

INVENTOR
Monroe W. Carroll
BY
Busser and Harding
ATTORNEYS.

Patented June 5, 1928.

1,671,978

UNITED STATES PATENT OFFICE.

MONROE W. CARROLL, OF BEAUMONT, TEXAS.

PUMP PLUNGER.

Application filed March 7, 1925. Serial No. 13,719.

My invention relates to pump plungers.

The object of the invention is to provide an improved plunger combining the qualities of lightness, strength, adaptability to withstand high external pressure, capacity of retaining its shape during the hardening process, and which insures against the possibility of the passage through it of the fluid being pumped in case of any leakage through the parts uniting the pump rod to the plunger.

A preferred embodiment of the invention is shown in the accompanying drawings, in which—

Figure 1:
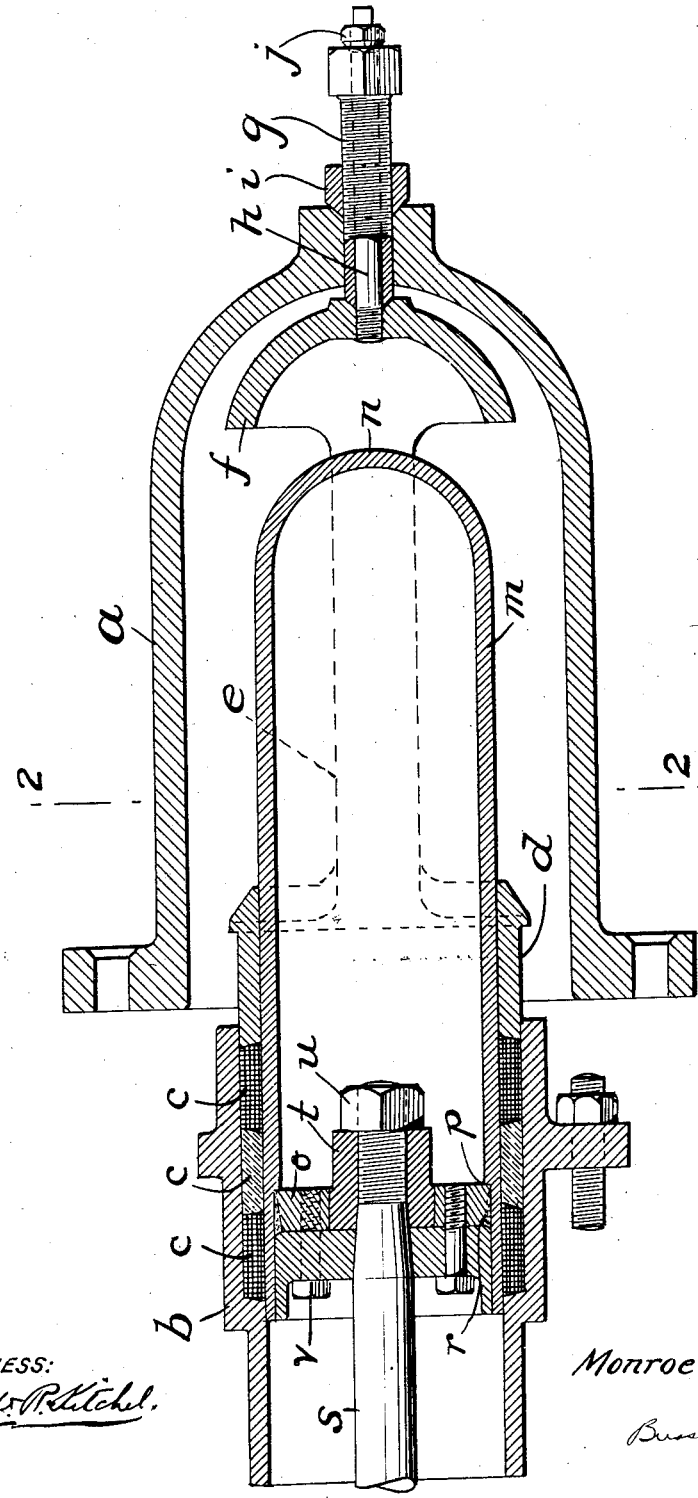
Fig. 1 is a longitudinal section view of my improved plunger and parts connecting same with pump rod and associated with the pump head.
Figure 2:
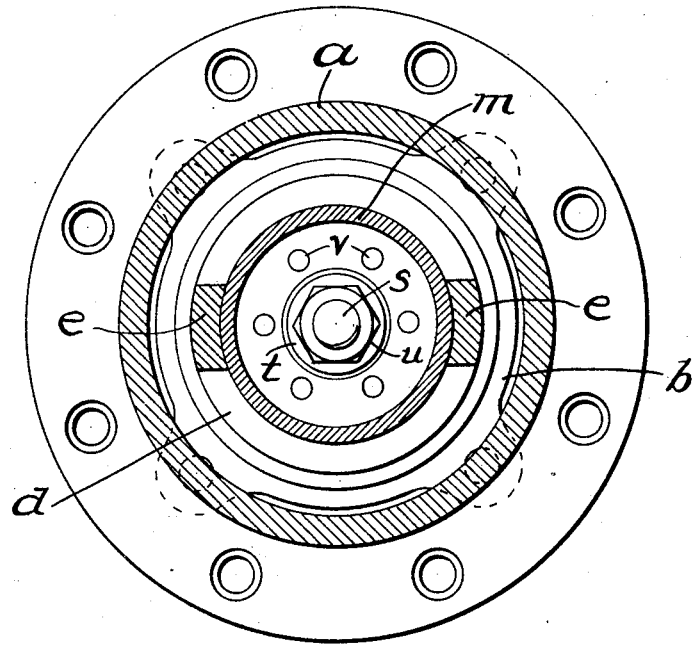
Fig. 2 is a section through the line 2—2 of Fig. 1.
Figure 3:
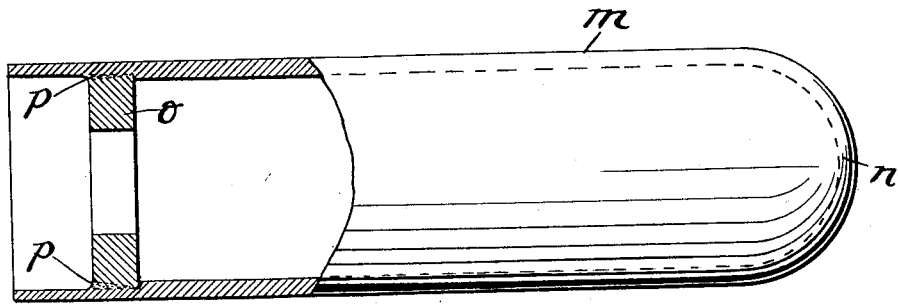
Fig. 3 is a side view, partly in longitudinal section, of the plunger.
Figure 4:
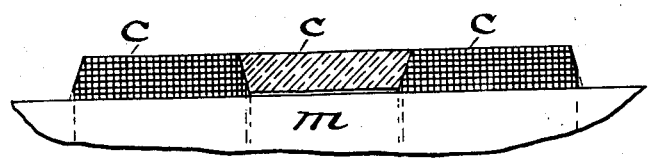
Fig. 4 is a sectional view of the packing.

$a$ is the pump head, $b$ is the cylinder or stuffing box liner. $c$, $c$, $c$ are packing rings (the central ring being preferably of bronze and the end rings of rubber) within the shouldered end of the cylinder liner $b$. $d$ is a gland extending within the shouldered end of the cylinder liner and engaging the end packing ring. $e$ is a yoke supporting gland $d$ and having an end head $f$.

The mechanism for holding gland $d$ in position against the packing rings comprises a hollow adjusting screw $g$ having a tapered end engaging a tapered seat in head $f$; a gland screw $h$ extending through screw $g$ and threaded in head $f$; a lock nut $i$ threaded on adjusting screw $g$ and engaging a seat in the pump head; and a lock nut $j$ on the outer end of screw $h$ and engaging a seat on the end head of screw $g$.

The above described parts form no part of the present invention, as it forms the subject-matter of an application filed by me January 7, 1924, Serial No. 684,694.

The pump plunger comprises a tubular or cylindrical body $m$ having a closed or solid end $n$ integral with the body and of approximately oval or semi-spherical shape. This plunger may be made out of thin metal sheets, but is preferably made of seamless, drawn steel tubing. In forming the same from tubing, the end may be closed by the cooperative action of a die and hammer plunger whereby the end of the tubing is upset to form a closed end.

The pump plunger has an internal flange $o$. This may be formed as a separate ring and welded to the plunger. To facilitate the welding operation, it is preferred to form the rear of the plunger of slightly greater internal diameter to form an annular shoulder $p$ against which the flange $o$ seats; the outside of the flange being tapered rearwardly toward the axis of the plunger to afford an annular wedge-shaped recess to receive the uniting welding metal $r$.

The pump rod $s$ is tapered back of its forward end, and its forward end, of reduced diameter, is threaded. A plunger follower $t$ is threaded on rod $s$ and surrounds also the tapered portion of rod $s$ and is secured in position by means of a lock nut $u$. The rear portion of the follower is of a diameter adapting it to fit within the plunger. The front neck portion of the follower is of a diameter adapting it to fit within the flange $o$.

The rod $s$ carrying the follower $t$ is secured to the plunger by means of tap bolts $v$ which extend through the larger diameter rear portion of the follower and the flange $o$.

The illustrated and above described pump plunger presents the following substantial advantages: It combines lightness and strength; it is capable of withstanding high external pressures; it holds its shape while being case-hardened; and due to the lightness of the plunger, the strain on the packing is reduced to a minimum, thereby retarding wear.

The described and illustrated means for connecting the plunger to the plunger rod is unlikely to permit leakage through such connecting means, but no means of absolutely insuring against such leakage can be devised. If, however, in the present construction, there should be any leakage of the fluid being pumped through the parts connecting the plunger to the pump rod (due to such parts developing some mechanical or other defect), such fluid would be held in the hollow closed plunger and could not possibly pass through it. This is another important advantage of the invention.

Having now fully described my invention, what I claim and desire to protect by Letters Patent is:

1. The combination with a pump rod, of a pump plunger comprising a hollow cylindrical body and integral therewith a closed front end spaced a substantial distance from the front of the pump rod, and means by which the rear part of the plunger body is closed and secured to the front part of the pump rod, the closed front end of the plunger being of a rounded approximately semispherical shape and of a substantially uniform thickness substantially the same as that of the adjacent part of the cylindrical body.

2. The combination with a hollow pump plunger and pump rod, the plunger having a closed outer end and an internal annular flange connected thereto at its inner end, the wall of the plunger extending rearwardly beyond the flange, a follower secured to the plunger rod and having a part seated within the rear end of the plunger wall and abutting against the annular flange and a part seated within the opening in the annular flange, and means securing the follower to said flange.

3. A pump plunger comprising a cylindrical body having an integral closed and rounded front end and an annular rearwardly facing shoulder near its rear end, and a ring back of and seated against said shoulder and welded to the plunger body to form an internal annular flange thereon.

4. A pump plunger comprising a cylindrical body having an integral closed and rounded front end and an annular rearwardly facing shoulder near its rear end, and a ring back of and seated against said shoulder and having its periphery tapered rearward to form between it and the inside of the plunger an annular wedge-shaped groove to receive welding metal.

5. The combination with a pump rod and a follower secured thereto, of a hollow pump plunger which surrounds and fits the follower and the front end of which is rounded and closed, and means securing the plunger to the follower.

6. The combination with a pump rod and a follower surrounding and secured to the front part of the rod, of a hollow cylindrical pump plunger having an open rear end surrounding and secured to the follower and a closed rounded integral front end spaced a substantial distance from the front of the pump rod, thereby forming a capacious chamber adapted to receive and hold any of the liquid being pumped which may leak past the follower.

7. The combination with a pump rod and a follower secured thereto, of a hollow pump plunger surrounding the follower and having a closed and rounded front end, an internal flange secured to the plunger and engaging the follower, and means securing said flange to the follower.

8. The combination with a pump rod tapered near its front end and threaded in front of its tapered portion, and a follower having a rear part of relatively large diameter fitting the tapered part of the rod and a front neck of relatively small diameter screwed on the threaded front part of the rod, of a hollow pump plunger whose rear end surrounds the follower and whose front end is rounded and closed, an internal annular flange on the pump plunger fitting the angle between the enlarged rear and contracted neck of the follower, and bolts uniting said plunger flange with the enlarged rear of the follower.

In testimony of which invention, I have hereunto set my hand, at Philadelphia, Pennsylvania, on this 3rd day of March, 1925.

MONROE W. CARROLL.